(12) United States Patent
Storz et al.

(10) Patent No.: US 12,168,480 B2
(45) Date of Patent: Dec. 17, 2024

(54) COMPOSITE TRUCK BODY KITS

(71) Applicant: Wabash National, L.P., Lafayette, IN (US)

(72) Inventors: Scott Storz, Lafayette, IN (US); Travis Smith McCloud, Malabar, FL (US); Bryan Yielding, Riceville, TN (US); Timothy Frederick Marling, Granger, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 17/533,853

(22) Filed: Nov. 23, 2021

(65) Prior Publication Data
US 2022/0161871 A1    May 26, 2022

Related U.S. Application Data

(60) Provisional application No. 63/118,335, filed on Nov. 25, 2020.

(51) Int. Cl.
*B62D 33/04*    (2006.01)
*B62D 29/04*    (2006.01)

(52) U.S. Cl.
CPC ......... *B62D 33/046* (2013.01); *B62D 29/045* (2013.01)

(58) Field of Classification Search
CPC .. B62D 33/046; B62D 33/048; B62D 29/045; B62D 27/06; B62D 65/18; E04B 2/58
USPC ......... 296/182.1, 184.1, 185.1, 186.1, 186.3, 296/181.7, 181, 3, 181.6
See application file for complete search history.

(56) References Cited

U.S. PATENT DOCUMENTS

| | | | | |
|---|---|---|---|---|
| 3,746,388 A | * | 7/1973 | Robinson | B62D 27/026 296/181.6 |
| 4,145,080 A | * | 3/1979 | Miller | B60P 3/05 296/24.35 |
| 4,940,279 A | * | 7/1990 | Abott | B32B 7/12 52/309.8 |
| 5,588,693 A | * | 12/1996 | Higginson | B62D 33/046 296/29 |
| 11,027,783 B1 | * | 6/2021 | Asif | B60R 13/08 |

(Continued)

FOREIGN PATENT DOCUMENTS

| | | | | |
|---|---|---|---|---|
| CA | 2606859 A1 | * | 4/2008 | ......... B62D 33/046 |
| CN | 109955772 A | * | 7/2019 | ............ B23K 31/00 |

(Continued)

OTHER PUBLICATIONS

Package of documents and photograph related to MSC Refrigerated Trailer "kitted" component parts, irrelevant sensitive information redacted, dated as early as Jun. 24, 2019; 15 pages.

*Primary Examiner* — Gregory A Blankenship
(74) *Attorney, Agent, or Firm* — Faegre Drinker Biddle & Reath LLP (57) ABSTRACT

The present disclosure provides a kit assembly for a truck body including a plurality of composite panels that may be shipped from a manufacturer to a customer for subsequent assembly of the truck body. The composite panels of the kit assembly may be flat, rigid, and lightweight to facilitate shipment. The composite panels of the kit assembly may also include embedded anchors and/or adhered connectors to facilitate alignment and subsequent assembly of the cargo body using common mechanical fasteners.

10 Claims, 8 Drawing Sheets

FIG. 1

(56) References Cited

U.S. PATENT DOCUMENTS

| | | | | |
|---|---|---|---|---|
| 11,059,259 B2 * | 7/2021 | Baker | | B32B 37/06 |
| 11,318,702 B2 * | 5/2022 | Baker | | B32B 3/20 |
| 11,772,712 B2 * | 10/2023 | Storz | | B62D 29/043 |
| | | | | 296/184.1 |
| 11,807,309 B2 * | 11/2023 | McCloud | | B32B 5/26 |
| 2002/0033619 A1 * | 3/2002 | Hurst | | B62D 33/046 |
| | | | | 296/203.03 |
| 2007/0262601 A1 * | 11/2007 | Shoemaker | | B62D 63/061 |
| | | | | 296/51 |
| 2017/0240217 A1 | 8/2017 | Storz et al. | | |
| 2018/0037151 A1 | 2/2018 | Bauer et al. | | |
| 2018/0037404 A1 * | 2/2018 | Wang | | B62D 33/046 |
| 2020/0070894 A1 | 3/2020 | McCloud et al. | | |
| 2020/0307723 A1 * | 10/2020 | Norris | | E04C 2/00 |
| 2021/0046986 A1 * | 2/2021 | Labrecque | | B62D 63/08 |
| 2022/0084391 A1 * | 3/2022 | Cui | | G08B 29/02 |

FOREIGN PATENT DOCUMENTS

| | | | | |
|---|---|---|---|---|
| DE | 10163360 A1 * | 6/2002 | | B62D 33/046 |
| EP | 2524857 A1 * | 11/2012 | | B62D 33/046 |
| GB | 2103882 A | 2/1983 | | |
| GB | 2180802 A * | 4/1987 | | B62D 27/065 |

* cited by examiner

COMPOSITE TRUCK BODY KITS

CROSS-REFERENCE TO RELATED APPLICATION

The present application claims the benefit of U.S. Provisional Patent Application No. 63/118,335, filed Nov. 25, 2020, the entire disclosure of which is incorporated herein by reference.

FIELD OF THE DISCLOSURE

The present disclosure relates generally to composite structures and methods of making the same. More particularly, the present disclosure relates to kit assemblies for composite truck bodies and methods of manufacturing, transporting, and assembling the same.

BACKGROUND OF THE DISCLOSURE

Cargo vehicles are used in the transportation industry for transporting many different types of cargo. Certain cargo vehicles may be refrigerated and insulated to transport temperature-sensitive cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, such cargo materials must be sufficiently strong and durable to withstand the demands of normal use, both exteriorly (e.g., weather, road conditions, other vehicles) and interiorly (e.g., cargo, forklifts).

SUMMARY OF THE DISCLOSURE

The present disclosure provides a kit assembly for a truck body including a plurality of composite panels that may be shipped from a manufacturer to a customer for subsequent assembly of the truck body. The composite panels of the kit assembly may be flat, rigid, and lightweight to facilitate shipment. The composite panels of the kit assembly may also include embedded anchors and/or adhered connectors to facilitate alignment and subsequent assembly of the cargo body using common mechanical fasteners.

According to an embodiment of the present disclosure, a method for assembling a cargo body for a vehicle is disclosed. The method comprises manufacturing a composite floor assembly; manufacturing a composite first sidewall and a composite second sidewall; manufacturing a composite front wall; manufacturing a composite roof having a perimeter rail; packaging the composite floor assembly, the composite first sidewall, the composite second sidewall, the composite front wall, and the composite roof in a kit assembly; and shipping the kit assembly to a different location for subsequent assembly of the cargo body.

The kit assembly of the packaging step may further include a rear door assembly. The kit assembly may comprise a plurality of loose pieces, wherein the plurality of loose pieces comprises substantially only mechanical fasteners. The top rail may extend downward away from a top surface of the composite roof and may be configured to receive the composite first sidewall, the composite second sidewall, the composite front wall, and a rear door assembly during assembly after the shipping step.

The floor assembly may include an L-shaped connector having a horizontal portion beneath the floor assembly and a vertical portion configured to couple to the composite first sidewall, the composite second sidewall, the composite front wall, and a rear door assembly during assembly after the shipping step. The L-shaped connector may be continuous around a perimeter of the composite floor assembly. The L-shaped connector may be adhesively bonded to the composite floor assembly during the manufacturing step. In embodiments having an L-shaped connector, manufacturing the composite first sidewall may comprise adhesively bonding a first base rail connector to an outer surface of the composite first sidewall; manufacturing the composite second sidewall may comprise adhesively bonding a second base rail connector to an outer surface of the composite second sidewall; and manufacturing the composite front wall may comprise adhesively bonding a third base rail connector to an outer surface of the composite front wall; wherein the L-shaped connector of the floor assembly may be configured to be mechanically fastened to the first base rail connector, the second base rail connector, and the third base rail connector during assembly after the shipping step.

The method may further comprise manufacturing a first vertical rail and a second vertical rail. The composite first sidewall, the composite second sidewall, and the composite front wall may each include at least one recess configured to receive a portion of one of the first vertical rail and the second vertical rail. At least one of the composite first sidewall, the composite second sidewall, and the composite front wall may be smooth and fastener-free during the shipping step.

According to another embodiment of the present disclosure, a method for assembling a cargo body of a vehicle from a kit assembly is disclosed. The method comprises aligning a first base rail connector of a first sidewall with a connector on a first edge of a floor assembly; fastening the first base rail connector to the connector of the floor assembly; aligning a second base rail connector of a second sidewall with the connector on a second edge of the floor assembly; fastening the second base rail connector to the connector of the floor assembly; aligning a third base rail connector of the front wall to the connector of the floor assembly; aligning a fourth base rail connector of a rear door assembly with the connector on a fourth edge of the floor assembly; fastening the fourth base rail connector of a rear door assembly with the connector of the floor assembly; and positioning a roof having a top rail over the first sidewall, the second sidewall, the front wall, and the rear door assembly so that the top rail receives a portion of the first sidewall, the second sidewall, the front wall, and the rear door assembly.

The method may further comprise fastening the top rail of the room to at least one of the first sidewall, the second sidewall, and the front wall using mechanical fasteners, the mechanical fasteners being at least partially received by an embedded first roof anchor of the first sidewall, an embedded second roof anchor of the second sidewall, or an embedded third roof anchor of the front wall. The first base rail connector may be adhesively bonded to the first sidewall. The second base rail connector may be adhesively bonded to the second sidewall. The third base rail connector may be adhesively bonded to the front wall. The connector may be adhesively bonded to the floor assembly.

The method may further comprise aligning a first vertical so that a first portion of the first vertical rail overlaps the first sidewall and a second portion of the first vertical rail overlaps the front wall, and may further comprise fastening the second vertical rail to the second sidewall and the front wall using mechanical fasteners, so that the mechanical fasteners are at least partially received by either an embedded second front anchor of the second sidewall or an embedded second side anchor of the front wall. The method may further comprise aligning a second vertical rail so that a first portion of the second vertical rail overlap the second sidewall and a second portion of the second vertical rail overlaps the front wall, and may further comprise fastening the second vertical rail to the second sidewall and the front wall using mechanical fasteners, so that the mechanical fasteners are at least partially received by either an embedded second front anchor of the second sidewall or an embedded second side anchor of the front wall.

The rear door assembly may further comprise a first siderail connector, a second siderail connector, and a rear top rail. In such an embodiment, the method may further comprise fastening the top rail of the roof to the rear top rail; fastening the first siderail connector to the first sidewall using mechanical fasteners, so that the mechanical fasteners are at least partially received by an embedded first rear anchor of the first sidewall; and fastening the second siderail connector to the second sidewall using mechanical fasteners, so that the mechanical fasteners are at least partially received by an embedded second rear anchor of the second sidewall.

In yet another embodiment of the present disclosure, a kit assembly for a cargo body of a vehicle is disclosed. The kit assembly comprises a composite first sidewall including a first base rail connector coupled to a bottom edge of the first sidewall, an embedded first front anchor near a front edge of the first sidewall, an embedded first roof anchor near a top edge of the first sidewall, and an embedded first rear anchor near a rear edge of the first sidewall; a composite second sidewall including a second base rail connector coupled to a bottom edge of the second sidewall, an embedded second front anchor near a front edge of the second sidewall, an embedded second roof anchor near a top edge of the second sidewall, and an embedded second rear anchor near a rear edge of the second sidewall; a composite front wall including a third base rail connector coupled to a bottom edge of the front wall, an embedded first side anchor near a first edge of the front wall, an embedded third roof anchor near a top edge of the front wall, and an embedded second side anchor near a second edge of the front wall opposite the embedded first side anchor; and a composite roof including a top rail extending away from a top surface of the roof. The kit assembly has a first configuration in which the composite first sidewall, the composite second sidewall, the composite front wall, and the composite roof are stacked for shipment to a customer, and a second configuration in which the composite roof is aligned with the first sidewall, the second sidewall, and the front wall with the top rail at least partially overlapping the embedded first roof anchor, the embedded second roof anchor, and the embedded third roof anchor.

The kit assembly may further comprise a rear door assembly including a base rail connector, a first siderail connector coupled to the base rail connector and extending away from the base rail connector, a rear top rail coupled to the first side rail connector opposite the base rail connector, and a second siderail connector coupled to the base rail connector and the rear top rail opposite the first siderail connector. The kit assembly may further comprise a plurality of loose pieces comprising substantially only mechanical fasteners.

In yet another embodiment of the present disclosure, a method for assembling a cargo body for a vehicle is disclosed, the method comprising manufacturing a composite floor assembly; manufacturing a composite first sidewall and a composite second sidewall; manufacturing a composite front wall; manufacturing a composite roof having a perimeter rail; packaging the composite floor assembly, the composite first sidewall, the composite second sidewall, the composite front wall, the composite roof, and mechanical fasteners in a kit assembly; and shipping the kit assembly to a different location for subsequent assembly of the cargo body, wherein shipping the kit assembly is configured for assembly of the kit assembly using only the mechanical fasteners.

The kit assembly of the packaging step may further include a rear door assembly. The kit assembly may comprise a plurality of loose pieces, the plurality of loose pieces comprising substantially only mechanical fasteners. The top rail may extend downward away from a top surface of the composite room and be configured to receive the composite first sidewall, the composite second sidewall, the composite front wall, and a rear door assembly during assembly after the shipping step. The floor assembly may include an L-shaped connector having a horizontal portion beneath the floor assembly and a vertical portion configured to couple to the composite first sidewall, the composite second sidewall, the composite front wall, and a rear door assembly during assembly after the shipping step.

The L-shaped connector may be continuous around a perimeter of the composite floor assembly. The L-shaped connector may be adhesively bonded to the composite floor assembly during the manufacturing step. Manufacturing the composite first sidewall may comprise adhesively bonding a first base rail connector to an outer surface of the composite first sidewall before the packaging step. Manufacturing the composite second sidewall may comprise adhesively bonding a second base rail connector to an outer surface of the composite second sidewall before the packing step. Manufacturing the composite front wall may comprise adhesively bonding a third base rail connector to an outer surface of the composite front wall before the packaging step. The L-shaped connector of the floor assembly may be configured to be mechanically fastened to the first base rail connector, the second base rail connector, and the third base rail connector during assembly after the shipping step.

The method may further comprise manufacturing a first vertical rail and a second vertical rail. The composite first sidewall, the composite second sidewall, and the composite front wall may each include at least one recess configured to receive a portion of one of the first vertical rail and the second vertical rail. At least one of the composite first sidewall, the composite second sidewall, and the composite front wall may be smooth and fastener-free during the shipping step.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 1:
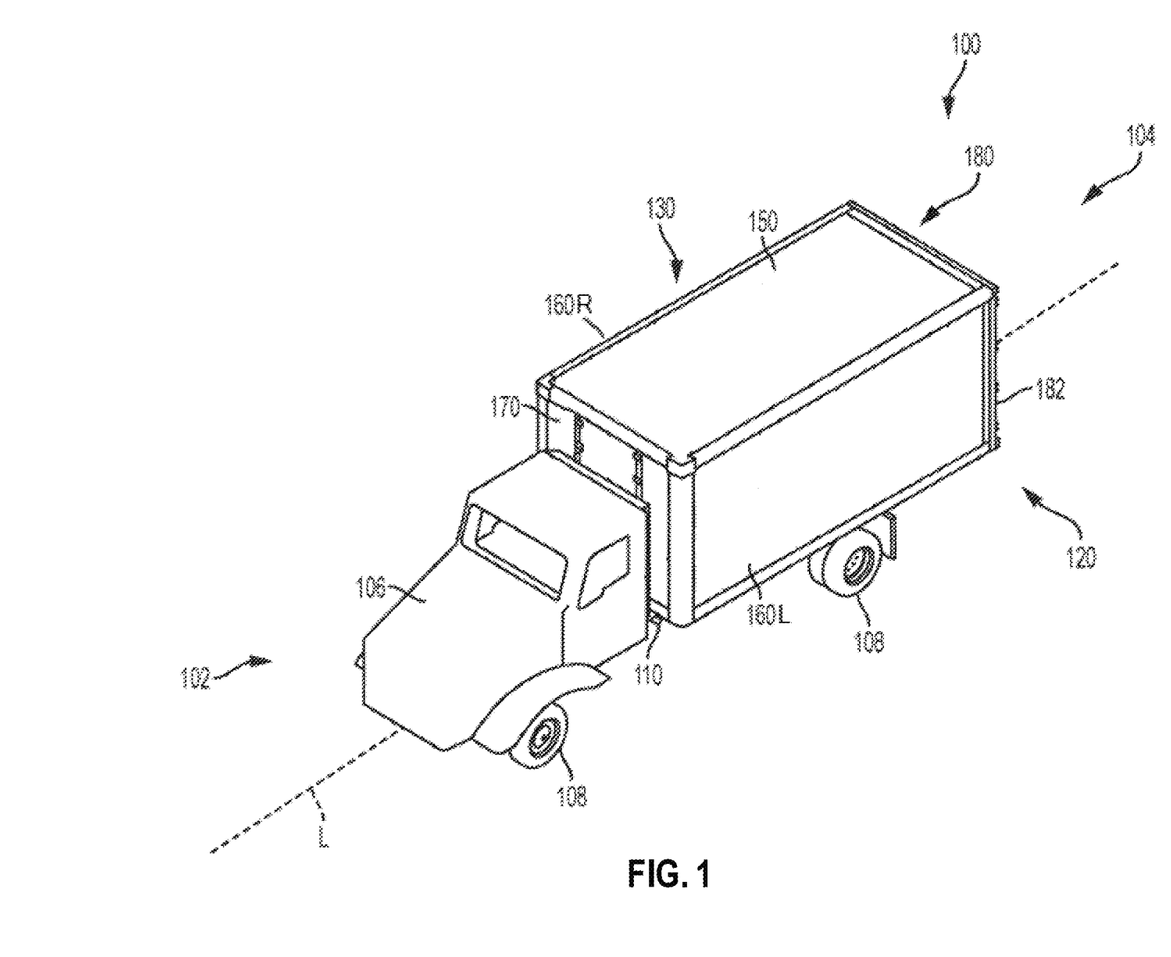
FIG. 1 is a perspective view of a cargo vehicle having a cargo body having a floor assembly, a roof, right and left sidewalls, and a front wall.

Referring initially to FIG. 1, a cargo vehicle 100 is shown for supporting and transporting cargo. The illustrative straight frame vehicle 100 extends along a longitudinal axis L from a front end 102 to a rear end 104 and includes a motorized truck 106 that powers a plurality of wheels 108 or other traction devices, a chassis 110, and a bumper assembly 120. The illustrative vehicle 100 further includes a cargo body 130 having a floor assembly 140 (FIG. 3) for supporting cargo, a roof 150, right and left sidewalls 160R, 160L, a front wall or nose 170, and a rear door assembly 180 having a rear frame 182 and a door (not shown) to access the cargo body 130.

In the illustrated embodiment of FIG. 1, cargo body 130 is an enclosed body that is supported atop chassis 110. Cargo body 130 may be refrigerated and/or insulated to transport temperature-sensitive cargo. While the concepts of this disclosure are described in relation to a refrigerated truck body, it will be understood that they are equally applicable to other vehicles generally, and more specifically to conventional trailers, including, for example, dry freight trailers, flatbed trailers, commercial trailers, and small personal trailers, and/or box or van semi-trailers, and the like. Accordingly, those skilled in the art will appreciate that the present invention may be implemented in a number of different applications and embodiments and is not specifically limited in its application to the particular embodiments depicted herein.

2. Composite Panels

Cargo body 130 may be constructed, at least in part, of composite panels. For example, the floor 140, roof 150, right and left sidewalls 160R, 160L, and/or front wall 170 of the composite cargo body 130 may be constructed of composite materials. As such, the floor 140, roof 150, right and left sidewalls 160R, 160L, and/or front wall 170 of the composite cargo body 130 may be referred to herein as composite panels. Each composite panel may be a single, unitary component, which may be formed from a plurality of layers permanently coupled together. Exemplary composite materials for use in the composite cargo body 130 include fiber-reinforced polymers or plastics (FRPs), for example glass-fiber-reinforced polymers or plastics (GFRPs) and carbon-fiber-reinforced polymers or plastics (CRPs).

Figure 2:
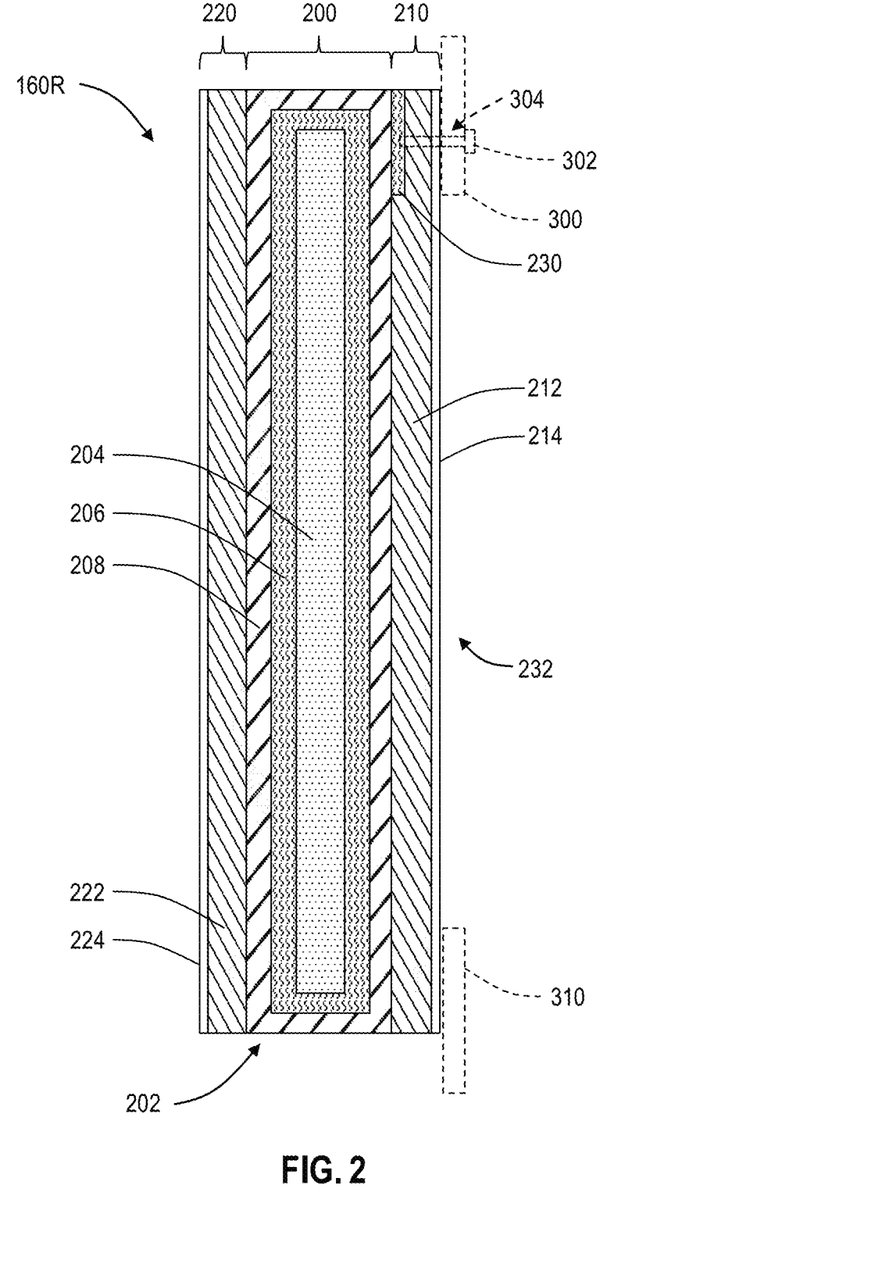
FIG. 2 is a cross-sectional view of the right sidewall of FIG. 1 having a mechanically fastened connector with an embedded anchor and an adhesively bonded connector.

A laminated composite right sidewall 160R is shown in cross-section in FIG. 2. Those skilled in the art will appreciate that the following teachings related to the right sidewall 160R may also be applied to the floor 140, roof 150, left sidewall 160L, and/or front wall 170 of the composite cargo body 130. With respect to the composite floor 140, in particular, details of the construction may be found U.S. Pat. No. 10,829,163, the disclosure of which is hereby incorporated by reference in its entirety.

The illustrative sidewall 160R of FIG. 2 includes a core layer 200, an outer skin layer 210 that faces outwardly from the cargo body 130 (FIG. 1) toward the surrounding environment, and an inner skin layer 220 that faces inwardly toward the cargo in cargo body 130 (FIG. 1). Each of these laminated layers 200, 210, 220 is described further below.

Referring still to FIG. 2, the core layer 200 of the composite sidewall 160R may include one or more structural supports or preforms 202. Exemplary preforms 202 for use in core layer 200 include PRISMA® preforms provided by Compsys, Inc. of Melbourne, Fla. Each preform 202 may include an inner foam core 204, an intermediate layer 206, and an outer FRP layer 208, each of which is described further below.

The inner foam core 204 of each preform 202 may include a self-expanding, self-curing structural foam material. Suitable foams include polyurethane foams, such as a methylene-diphenyl-methane diisocyanate (MDI) based rigid polyurethane foam, for example.

The outer FRP layer 208 (which may be referred to herein as the "first" FRP layer 208) of each preform 202 may include a polymer matrix reinforced with fibers configured to enhance the structural properties of the surrounding polymer matrix. Suitable reinforcing fibers include glass fibers, carbon fibers, aramid fibers (e.g., Kevlar® fibers available from DuPont Protection Technologies of Richmond, Va.), linear polyethylene or polypropylene fibers (e.g., Spectra® fibers available from Honeywell International Inc. of Morris Plains, N.J.), or polyester fibers. The reinforcing fibers may be present in fabric form, which may be mat, woven, or knit, for example. Exemplary fabrics include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Exemplary fabrics are commercially available from Vectorply Corporation of Phenix City, Ala. and include the E-LM 1810 fiberglass fabric with 0° unidirectional fibers, the E-LTM 3610 fiberglass fabric with 0°/90° fibers, and the EL TM 2408 fiberglass fabric with 0°/90° fibers, for example. Such fabrics may have an area density of about 800 g/m2 to about 1,500 g/m2 or more.

The intermediate layer 206 of each preform 202 may serve as a transition layer for coupling the inner foam core 204 to the outer FRP layer 208. The intermediate layer 206 may be sufficiently porous to at least partially receive foam from the adjacent foam core 204 and the polymer matrix from the adjacent FRP layer 208. The intermediate layer 206 may also be mechanically coupled (e.g., stitched) to the adjacent FRP layer 208 to simplify manufacturing, to ensure proper placement, and to prevent shifting and/or bunching. The intermediate layer 206 may be a nonwoven fabric with continuous or chopped fibers.

The individual preforms 202 of the core layer 200 may be designed to accommodate the needs of the particular application. For example, in areas of the final structure requiring more strength and/or insulation, a low-density foam core 204 may be replaced with a high-density foam core 204 or a hard, plastic block. The individual preforms 202 of the core layer 200 may also be sized, shaped, and arranged in a manner that accommodates the needs of the particular application. For example, in areas of the final structure requiring less strength (for example, most areas of the sidewalls 160L, 160R), the preforms 202 may be relatively large in size, with the foam cores 204 spanning relatively large distances before reaching the surrounding layers 206, 208. By contrast, in areas of the final structure requiring more strength (for example, most areas of the floor 140), the preforms 202 may be relatively small in size, with the foam cores 204 spanning relatively small distances before reaching the surrounding layers 206, 208. Stated differently, the preforms 202 may be shaped as relatively wide panels in areas of the final structure requiring less strength and as relatively narrow support beams in areas of the final structure requiring more strength.

Referring still to FIG. 2, the outer skin layer 210 of the composite sidewall 160R may include a FRP layer 212 and an outer gel coat 214. The FRP layer 212 (which may be referred to herein as the "second" FRP layer 212) may be similar to the above-described first FRP layer 208, including a polymer matrix reinforced with suitable reinforcing fibers. According to an exemplary embodiment of the present disclosure, a plurality of different reinforcing fiber layers may be stacked together and used in combination to form the FRP layer 212. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing fiber layers may be stitched or otherwise coupled together to simplify manufacturing, to ensure proper placement, and to prevent shifting and/or bunching. The outer gel coat 214 may be a polymer-rich or polymer-only layer that provides a smooth outer finish in a desired color.

Referring still to FIG. 2, the inner skin layer 220 of the composite sidewall 160R may include a FRP layer 222 and an optional inner gel coat 224. The FRP layer 222 (which may be referred to herein as the "third" FRP layer 222) may be similar to the above-described first and second FRP layers 208, 212, including a polymer matrix reinforced with suitable reinforcing fibers. The inner gel coat 224 may be a polymer-rich or polymer-only layer similar to the above-described outer gel coat 214 that provides a smooth inner finish in a desired color.

The illustrative composite sidewall 160R of FIG. 2 is mechanically fastened to a first connector 300, as described in Section 3 below, and adhesively bonded to a second connector 310, as described in Section 4 below.

During manufacturing, the composite panels of the present disclosure, including the composite sidewall 160R of FIG. 2, may be formed by a layered molding process. An exemplary molding process involves (1) applying a gel-coat resin onto a mold surface to form the outer gel coat 214, (2) layering the reinforcing fibers of the outer FRP layer 212, the preforms 202 of the core layer 200, the reinforcing fibers of the inner FRP layer 222, and any other desired layers (e.g., embedded anchor 230 of Section 3 below) onto the outer gel coat 214, (3) wetting out the layers 212, 200, 222, and any other applied layers with at least one laminating resin to impregnate and/or coat the fibers, (4) optionally applying another gel-coat resin onto the layers 212, 200, 222 to form the inner gel coat 224, and (5) curing the materials upon the mold surface (either sequentially and/or simultaneously) to form a single, integral, laminated composite sidewall 160R.

3. Mechanically Fastened Connector

As noted above, the composite sidewall 160R is mechanically fastened to a first connector 300 via one or more mechanical fasteners 302 (e.g., bolts, screws, rivets, nails) extending through corresponding holes 304 in the first connector 300. To locally strengthen the composite sidewall 160R and resist withdrawal of the fastener 302, the composite sidewall 160R may include one or more embedded anchors 230, similar to a wood stud behind drywall. The illustrative embedded anchor 230 of FIG. 2 is positioned between the core layer 200 and the outer skin layer 210 and beneath the first connector 300. In this position, the embedded anchor 230 receives the fastener 302 through the outer skin layer 210.

The embedded anchor 230 may be selectively positioned to receive one or more fasteners 302 of the corresponding connector 300. Stated another way, the embedded anchor 230 may be selectively positioned in alignment with one or more holes 304 of the corresponding connector 300. As shown in FIG. 2, the embedded anchor 230 is located near a top end of the composite sidewall 160R to receive the fastener 302. The anchor 230 may span continuously along substantially the entire length of the composite sidewall 160R, or discrete anchors 230 may be positioned along the length of the composite sidewall 160R.

The areas of the composite sidewall 160R that do not receive fasteners 302 need not be further strengthened. As shown in FIG. 2, the embedded anchor 230 is located near a top end of the composite sidewall 160R, whereas the rest of the composite sidewall 160R beneath the embedded anchor 230 is an anchor-free area 232. The ability to selectively position the embedded anchor 230 may improve the anchoring of fasteners 302 where necessary while also minimizing the weight and thickness of the composite sidewall 160R.

The material used to construct the embedded anchor 230 may vary. In general, the material used to construct the embedded anchor 230 may differ from the material used to construct the surrounding composite sidewall 160R. In certain embodiments, the embedded anchor 230 may be constructed of a nonwoven fabric veil that becomes integrated into the surrounding polymer matrix of the outer skin layer 210, such as a polyester-based Trevira fabric available from Trevira GmbH in Bobingen, Germany. Additional information regarding the use of such nonwoven fabric veils as embedded anchors 230 is set forth in U.S. Provisional Application No. 62/951,041, filed Dec. 20, 2019, titled COMPOSITE STRUCTURES WITH EMBEDDED VEILS FOR ANCHORING FASTENERS, the disclosure of which is hereby incorporated by reference in its entirety. In other embodiments, the embedded anchor 230 may be constructed of metallic materials (e.g., steel, aluminum, titanium), polymeric materials, wood, or other composite materials. The embedded anchor 230 may be fabricated by extrusion, pultrusion, sheet forming, roll forming, and/or casting, for example. The embedded anchor 230 may also be single-piece construct or multi-piece construct that is welded, mechanically fastened, adhered, snap-fit, or otherwise coupled together.

4. Adhesively Bonded Connector

As noted above, the composite sidewall 160R is adhesively bonded to the second connector 310.

In certain embodiments, the outer gel coat 214 may be a co-cure resin that is configured to adhere directly to the second connector 310. Thus, in addition to serving as the outer gel coat 214, the co-cure resin may also serve as the adhesive that bonds to the second connector 310. During manufacturing, the second connector 310 may be applied to the co-cure resin as it cures, thereby simultaneously forming the outer gel coat 214 upon the composite sidewall 160R and adhering the second connector coat 214 to the composite sidewall 160R. Additional information regarding the use of such co-cure resins as adhesives is set forth in US Publication No. 2017/0239916, the disclosure of which is hereby incorporated by reference in its entirety.

In other embodiments, a layer of structural adhesive (not shown) may be used between the composite sidewall 160R and the second connector 310. Suitable structural adhesives include, for example, epoxies, acrylics, urethanes (single and two part), polyurethanes, methyl methacrylates (MMA), cyanoacrylates, anaerobics, phenolics, and/or vinyl acetates. During manufacturing, the adjoining surfaces may be pre-treated (e.g., abraded, cleaned, and/or primed), and then the structural adhesive may be applied between the adjoining surfaces and allowed to solidify (e.g., chemically cure).

5. Kit

Now referring to FIGS. 3-7, individual components of the cargo body 130—including the floor assembly 140, the roof 150, the sidewalls 160L, 160R, the nose 170, left and right vertical rails 173L, 173R, and the rear door assembly 180—are shown and described. Each component of the cargo body 130 may have embedded anchors as discussed above in Section 3 (generally shown in broken lines) and/or adhered connectors as discussed above in Section 4 (generally shown in solid lines) to allow for easy alignment and assembly of the cargo body 130 upon delivery to a customer as discussed further herein.

Figure 3:
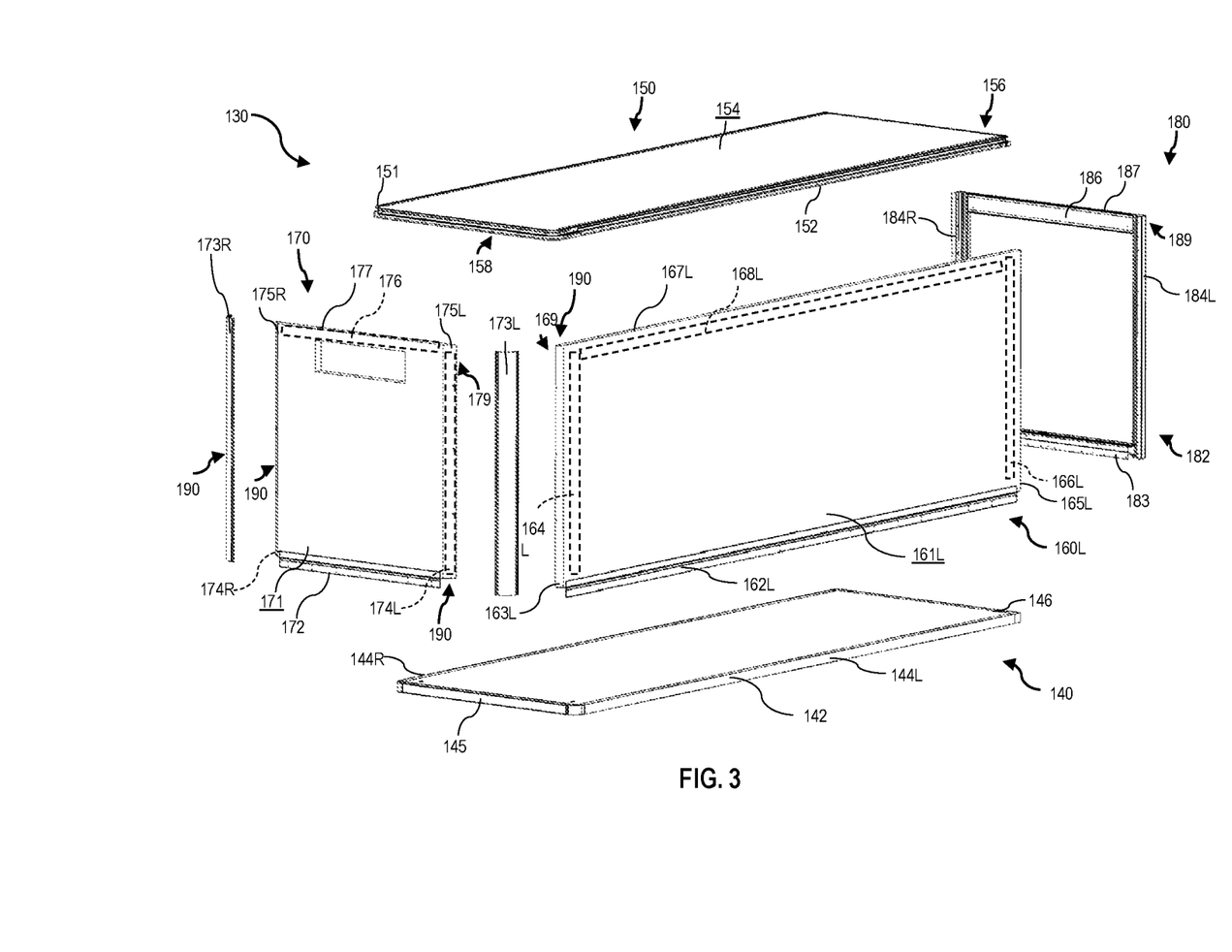
FIG. 3 is a partial exploded view of the cargo body of FIG. 1 showing the components that may be included in a kit assembly.
Figure 6:
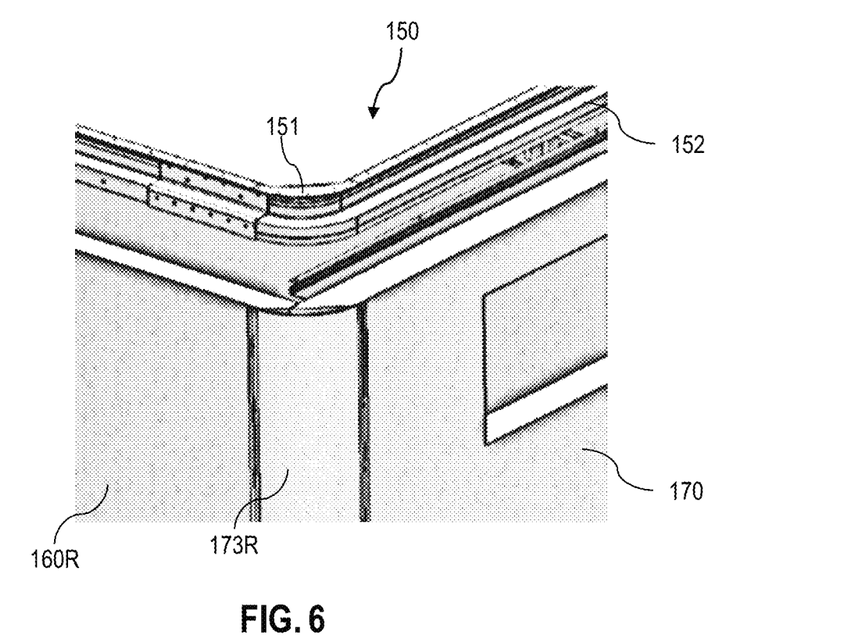
FIG. 6 is a close-up partial exploded view of the front wall, the right sidewall, and the roof of the cargo body of FIG. 1 showing the alignment of said components.
Figure 7:
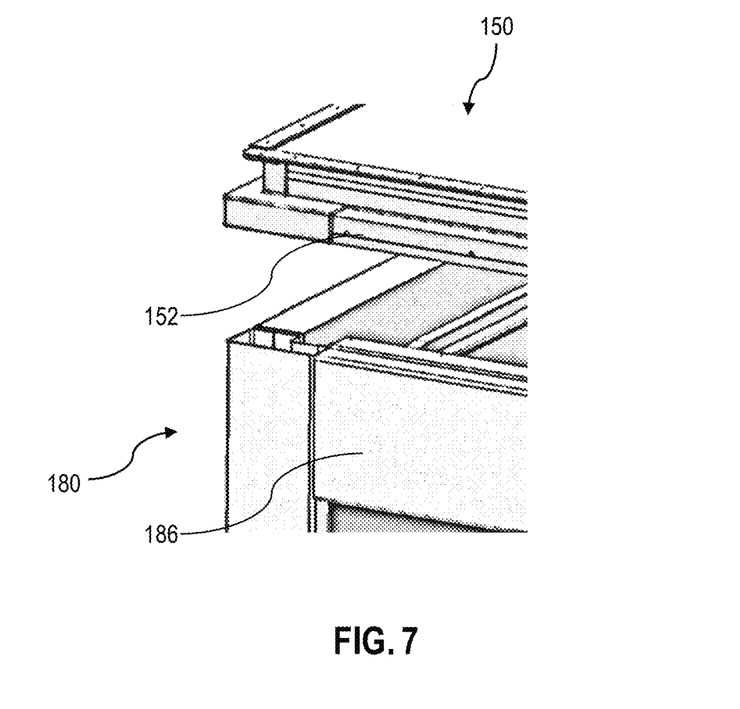
FIG. 7 is a close-up partial exploded view of the roof, the left sidewall, and a rear frame of the cargo body of FIG. 1 showing the alignment of said components.

The left vertical rail 173L and the right vertical rail 173R are shown in FIGS. 3 and 6 and are configured to couple the nose 170 to a respective sidewall 160L, 160R. As illustrated, each of the vertical rails 173L, 173R has an arcuate, or curved, shape so that a front portion of each of the vertical rails 173L, 173R couples with the nose 170 and a rear portion of each of the vertical rails 173L, 173R couples to the corresponding sidewall 160L, 160R. In other embodiments, the vertical rails 173L, 173R may have a bent, or right-angled shape with evenly sized front and rear portions or unevenly sized front and rear portions. The vertical rails 173L, 173R may also have a vertical height corresponding with heights of both the nose 170 and each of the sidewalls 160L, 160R. A common height existing between these three components assists with alignment of the sidewalls 160L, 160R and the nose 170 during assembly as discussed further herein and also provides stability along the entire height of the cargo body 130 at the nose-end of the cargo body 130 when assembled. In other embodiments, the vertical rails 173L, 173R may have a differing height than that of either the nose 170 or the sidewalls 160L, 160R, as long as the vertical rails 173L, 173R are configured to facilitate the coupling of the nose 170 with the sidewalls 160L, 160R.

Figure 4:
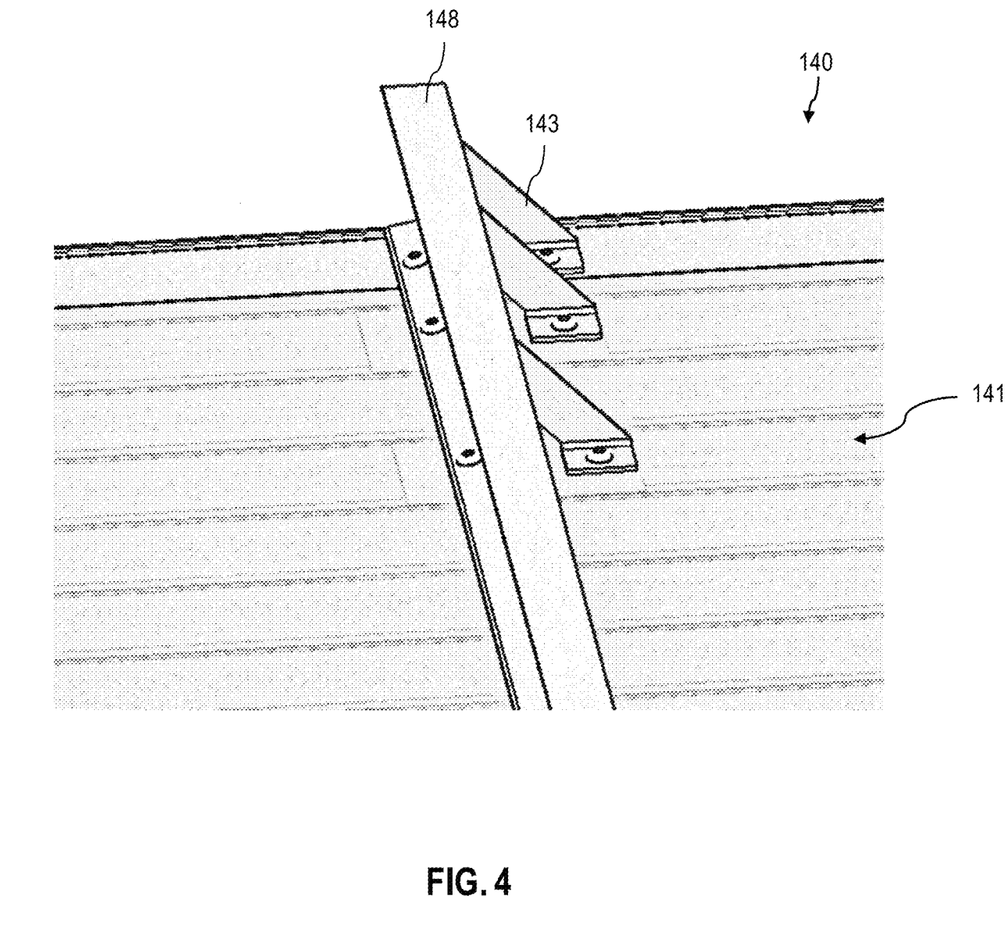
FIG. 4 is a close-up view of an underside of the floor assembly of the cargo body of FIG. 1.
Figure 5:
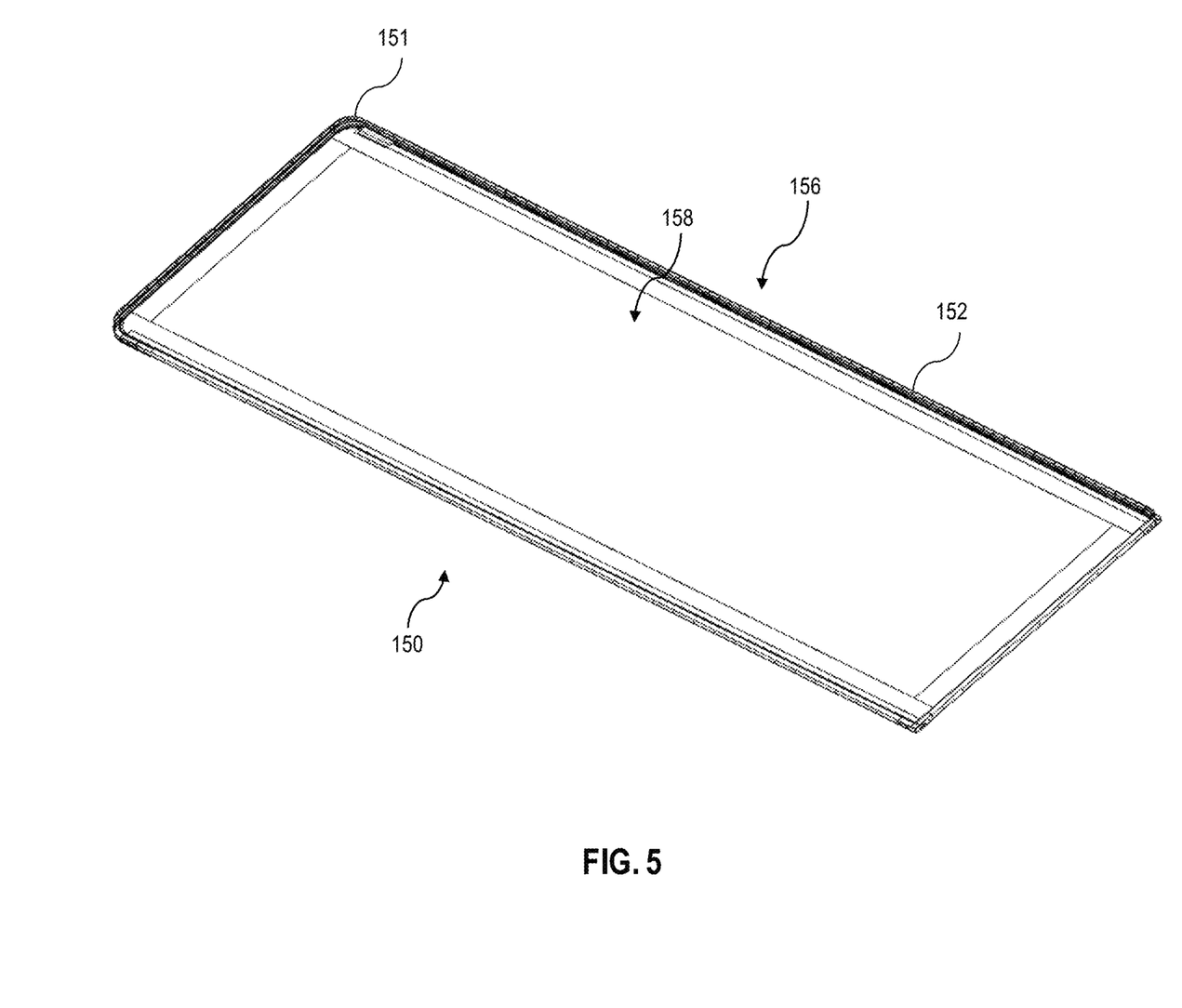
FIG. 5 is a perspective view of an underside of the roof of the cargo body of FIG. 1.
Figure 9:
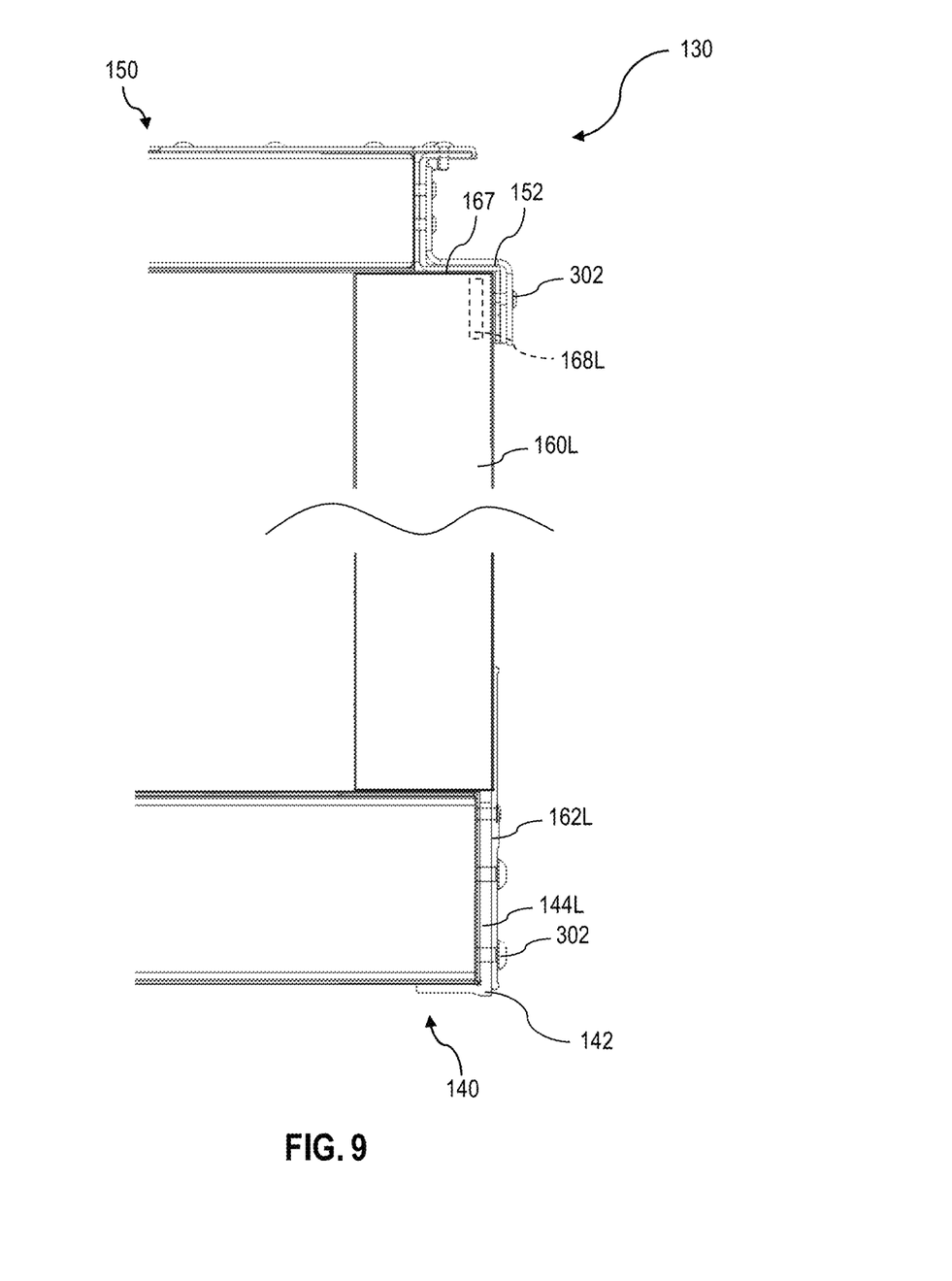
FIG. 9 is a cross-sectional view of the left sidewall, the floor, and the roof of the cargo body of FIG. 1 showing the coupling of said components.

The floor assembly 140 of the cargo body 130 is shown in FIGS. 3 and 4 and illustratively includes an L-shaped connector 142 positioned around its perimeter. The L-shaped connector 142 includes a horizontal portion that wraps beneath the floor assembly 140, as shown in FIG. 9, and vertical portions, including vertical sidewall portions 144L, 144R, a vertical nose portion 145, and a vertical rear frame portion 146. The L-shaped connector 142 may be mechanically fastened to the floor assembly 140 as discussed above in Section 3 and/or adhesively bonded to the floor assembly 140 as discussed above in Section 4. The L-shaped connector 142 may facilitate assembly of the cargo body 130 as discussed further herein.

As shown in FIG. 4, the floor assembly 140 includes left and right longitudinal beams 148 (only one of which is shown in FIG. 4) attached to an underside 141 of the floor assembly 140 to support the cargo body 130 (FIG. 3) and to couple the cargo body 130 to the chassis 110 (FIG. 1). The longitudinal beams 148 may comprise C-beams as shown, I-beams, Z-beams, or beams of other shapes. The longitudinal beams 148 may be mechanically fastened to the underside 141 of the floor assembly 140 and/or adhesively bonded to the underside 141 of the floor assembly 140. The longitudinal beams 148 are further supported torsionally by brackets 143.

The left sidewall 160L of the cargo body 130 is shown in FIG. 3. It is understood that the following description of the left sidewall 160L is also applicable to the right sidewall 160R (FIG. 1). The left sidewall 160L of FIG. 3 illustratively includes an external base rail connector 162L, an embedded nose anchor 164L, an embedded rear frame anchor 166L, and an embedded roof anchor 168L. Each of the embedded nose anchor 164L, the embedded rear frame anchor 166L, and the embedded roof anchor 168L are integrated into the left sidewall 160L and configured to operate as discussed above in Section 3. Specifically, the embedded anchors 164L, 166L, 168L are configured to receive mechanical fasteners during assembly of the cargo body 130 as discussed further herein. The illustrative base rail connector 162L may be mechanically fastened to the left sidewall 160L as discussed above in Section 3 and/or adhesively bonded to the left sidewall 160L as discussed above in Section 4. The left sidewall 160 may also include a recessed surface 190 at the nose end of the sidewall 160 corresponding with the left vertical rail 173L so that the left vertical rail 173L and the outside surface 161L of the left sidewall 160L are substantially flush when coupled. Internally, the left sidewall 160L may include one or more scuff rows, logistic tracks, shelving, or other components, as desired. These parts may be attached via adhesive, molding, and/or mechanical fasteners prior to kit packaging, or may be packaged loose with the kit assembly for attachment by the customer. Externally, the outside surface 161L of the left sidewall 160L may be smooth and fastener-free, with no bolts, rivets, or other mechanical fasteners present that may snag packaging or cause damage during transport.

The nose 170 of the cargo body 130 is shown in FIG. 3 and illustratively includes an external base rail connector 172, an embedded left sidewall anchor 174L, an embedded right sidewall anchor 174R, and an embedded roof anchor 176. Each of the embedded sidewall anchors 174L, 174R and the embedded roof anchor 176 is integrated into the nose 170 and configured to operate as discussed above in Section 3. Specifically, the embedded anchors 174L, 174R, 176 are configured to receive mechanical fasteners during assembly of the cargo body 130 as discussed further herein. The illustrative base rail connector 172 may be mechanically fastened to the nose 170 as discussed above in Section 3 and/or adhesively bonded to the nose 170 as discussed above in Section 4. The nose 170 may also include a left recessed surface 190 corresponding with the left vertical rail 173L and a right recessed surface 190 corresponding with the right vertical rail 173R. Each of these recessed surfaces is configured to align with the respective vertical rail 173L, 173R so that the vertical rails 173L, 173R and the outside surface 171 of the nose 170 are substantially flush when coupled. As with the outside surface 161L of the left sidewall 160L, the outside surface 171 of the nose 170 may be smooth and fastener-free.

The rear door assembly 180 of the cargo body 130 is shown in FIG. 3 and illustratively includes the rear frame 182 having a base rail connector 183, a left siderail connector 184L, a right siderail connector 184R, and a top rail 186. The base rail connector 183, the siderail connectors 184L, 184R, and the top rail 186 of the rear frame 182 may be assembled via mechanical fasteners, welding, adhesive, and/or other suitable coupling techniques. The rear door assembly 180 may further comprise an overhead door (not shown) and door tracks (not shown) for interior access to the cargo body 130 when assembled, or may include other doors or accessibility structures as known in the art.

The roof 150 of the cargo body 130 is shown in FIGS. 3 and 5-7 and illustratively includes a top rail 152 that extends downward from the underside 158 of the roof 150, away from a top surface 154 of the roof 150, and is continuous around the perimeter 156 of the roof 150. The top rail 152 is configured to at least partially overlap the outside surfaces 161L, 161R of the sidewalls 160L, 160R, the outside surface 171 of the nose 170, and the rear door assembly 180. More specifically, the top rail 152 is configured to at least partially overlap the embedded roof anchor 168L of the sidewall 160L, the embedded roof anchor 176 of the nose 170, and the top rail 186 of the rear door assembly 180 to facilitate assembly of the cargo body 130 as discussed further herein. In certain embodiments, the roof 150 is configured to fit over the sidewalls 160L, 160R, nose 170, and rear door assembly 180 in a manner similar to that of a shoebox lid, as further shown in FIGS. 6-7. The nose-end of the top rail 152 may include curved corners 151 corresponding to the curves of the vertical rails 173L, 173R so that the top rail 152 snugly surrounds the entire perimeter of the cargo body 130. The top rail 152 may be mechanically fastened to the roof 150 as discussed above in Section 3 and/or adhesively bonded to the roof 150 as discussed above in Section 4.

Figure 8:
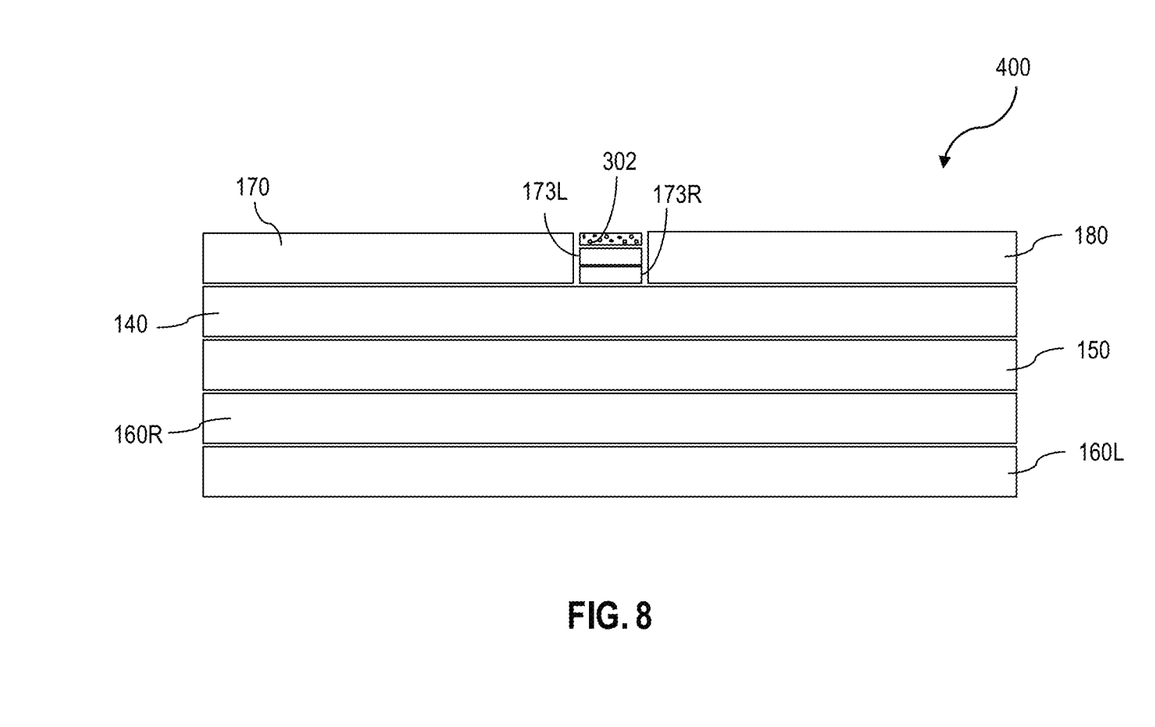
FIG. 8 is a schematic view of a kit assembly, wherein all of the components of the cargo body of FIG. 1 are stacked and packaged for shipment.

Now referring to FIG. 8, a kit assembly 400 of the cargo body 130 is illustrated. As shown, each component of the cargo body 130—including the floor assembly 140, the roof 150, the sidewalls 160L, 160R, the nose 170, the vertical rails 173L, 173R, and the rear door assembly 180—is stacked, packaged, or otherwise assembled to form the kit assembly 400. The composite panels of the cargo body 130, in particular, are flat, rigid, and lightweight as a result of their composite construction as discussed above in Section 2. Additionally, due to the prefabrication of the respective rails and embedded anchors as discussed above, the kit assembly 400 is suitable for compact stacking and handling, with minimal loose pieces. In certain embodiments, the only loose pieces that may be present in the kit assembly 400 include mechanical fasteners 302 for subsequent assembly of the cargo body 130 as discussed further herein. In other embodiments, as discussed above, the kit assembly 400 may include other loose pieces as desired by the customer for customization of the cargo body 130. For example, the longitudinal beams 148 (FIG. 4) may be pre-coupled to the floor assembly 140 as part of the kit assembly 400 or may be packaged loose with the kit assembly 400 for subsequent attachment by the customer.

The kit assembly 400 may be shipped from the manufacturer to the downstream customer for subsequent assembly as discussed further herein. This shipment of the kit assembly 400 may allow for final assembly of the cargo body 130 as discussed further herein to occur nearer to the customer, reducing shipping costs and reducing risk of damage during shipment of whole cargo bodies 130. Rather than shipping the kit assembly 400 made up of different components, it is also possible to ship packages containing a plurality of one component for bulk orders or replacement parts that the customer may store and utilize as needed for assembly of the cargo body 130 as described below.

6. Assembly of Kit

When the kit assembly 400 is received from the manufacturer as shown in FIG. 8, the cargo body 130 may be unpacked and oriented as shown in FIG. 3 and then assembled as shown in FIG. 9 using mechanical fasteners 302 as discussed above in Section 3. The kit assembly 400 may be packaged, shipped, and received without adhesive as discussed further herein.

The assembly process may begin with the floor assembly 140 lying flat and the L-shaped connector 142 exposed around its perimeter for attachment to the sidewalls 160L, 160R, nose 170, and rear door assembly 180. The sidewall 160L may be assembled by overlapping and mechanically fastening the base rail connector 162L to the vertical sidewall portion 144L of the L-shaped connector 142 as shown in FIG. 9. The right sidewall 160R may be assembled in a similar manner by mechanically fastening its base rail connector 162R (not shown) to the vertical sidewall portion 144R of the L-shaped connector 142. The nose 170 may be assembled by overlapping and mechanically fastening its base rail connector 172 to the vertical nose portion 145 of the L-shaped connector 142. The rear door assembly 180 may be assembled by overlapping and mechanically fastening its base rail connector 183 to the vertical rear frame portion 146 of the L-shaped connector 142. The L-shaped connector 142 of the floor assembly 140 and the adjacent base rail connectors 162L, 162R, 172, 183 may include predefined holes for the mechanical fasteners 302 (FIG. 2) to control the relative positioning of the components. The order of attaching the sidewalls 160L, 160R, nose 170, and rear door assembly 180 to the floor assembly 140 may vary.

With the sidewalls 160L, 160R and the nose 170 in alignment, the vertical rails 173L, 173R may then be placed into position as described above, so that a portion of each of the vertical rails 173L, 173R overlaps a portion of the corresponding sidewall 160L, 160R and the nose 170. In some embodiments, the vertical rails 173L, 173R may be placed so that a rear portion of the vertical rail 173L, 173R is received by a recess 190 in the corresponding sidewall 160L, 160R and a front portion of the vertical rail 173L, 173R is received by a recess 190 in the nose 170. The vertical rails 173L, 173R may be mechanically fastened to each of the corresponding sidewalls 160L, 160R and the nose 170 so that the mechanical fasteners 302 (FIG. 2) are received by and anchored into the embedded sidewall anchors 174L, 174R of the nose 170 and the embedded nose anchors 164L, 164R of the sidewalls 160L, 160R. The vertical rails 173L, 173R stabilize the cargo body 130 by securing the sidewalls 160L, 160R to the nose 170 and also provide a cleaner appearance at the corners of the cargo body 130. In embodiments where the vertical rails 173L, 173R are received by recesses 190, the transition from the nose 170 to the sidewalls 160L, 160R may appear substantially flush and seamless.

With the sidewalls 160L, 160R and the rear door assembly 180 in alignment, the left sidewall connector 184L of the rear door assembly 180 aligns with the rear end edge 165L of the left sidewall 160L, and the right sidewall connector 184R of the rear door assembly 180 aligns with the rear end edge 165R of the right sidewall 160R (not shown). Mechanical fasteners 302 may then be used to fasten the left sidewall connector 184L of the rear door assembly 180 to the rear end edge 165L of the left sidewall 160L and the right sidewall connector 184R of the rear door assembly 180 to the rear end edge 165R of the right sidewall 160R so that at least a portion of each of the mechanical fasteners 302 is received by and anchored into one of the embedded rear frame anchors 166L, 166R.

The coupling of the sidewalls 160L, 160R, the nose 170, and the rear door assembly 180 with the floor assembly 140 ensures alignment of these components for fitting of the roof 150. The sidewalls 160L, 160R, the nose 170, and the rear door assembly 180 may cooperate to form an even top edge around the perimeter of the cargo body 130. In other words, a top edge 167L, 167R (not shown) of each of the sidewalls 160L, 160R, a top edge 177 of the nose 170, and a top edge 187 of the rear door assembly 180 align so that the cargo body 130 has a continuous, even top edge to support the roof 150.

Referring to FIG. 9, the roof 150 is placed on top of the sidewalls 160L, 160R, the nose 170, and the rear door assembly 180 so that the roof 150 rests on the continuous top edge of the cargo body 130 and the top rail 152 of the roof 150 overlaps an upper portion 169 of the sidewalls 160, an upper portion 179 of the nose 170, and at least a portion of the top rail 186 of the rear door assembly 180. As shown in FIG. 9, mechanical fasteners 302 may then be used to secure the roof 150 to the sidewalls 160L, 160R, the nose 170, and the rear door assembly 180 so that at least a portion of each of the mechanical fasteners 302 is received by and anchored into one of the embedded roof anchors 168L, 168R (not shown) of the sidewalls 160, the embedded roof anchor 176 of the nose 170, and/or the top rail 186 of the rear door assembly 180.

Unpackaging of the kit assembly 400 and assembly of the cargo body 130 requires only common tools and/or use of common mechanical fasteners 302 (FIG. 2), such as self-tapping bolts or other nuts and bolts. Adhesive bonding or use of large machines is not needed when the kit assembly 400 is received from the manufacturer, as such adhesive bonding or other pre-forming has already been completed prior to packaging the kit assembly 400. Thus, the kit assembly 400 allows customers to receive and store kit assemblies 400 and assemble cargo bodies 130 as needed without the facilities, special machinery, cost, expertise, specific environmental conditions, or other resources needed to assemble conventional cargo bodies using adhesive. More particularly, the use of adhesive during assembly or manufacture of various components may require specific conditions, facilities, and expertise, thereby making assembly difficult in the field or at the location of the customer or user receiving the kit assembly 400. In this way, the present kit assembly 400 overcomes the need for anything more than simple mechanical fasteners at the location of the customer or user because no adhesive is needed to assemble together the cargo body 130. An additional composite layer may be included in each component to additionally allow the use of pull rivets to close any existing gaps between the components. Caulk may also be used to fill any existing gaps at the discretion of the customer.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A method for assembling a cargo body for a vehicle, the method comprising:
   manufacturing a composite floor assembly including an L-shaped connector continuous around an entire perimeter to the composite floor assembly, the L-shaped connector a vertical portion and a horizontal portion beneath the floor assembly;
   manufacturing a composite first sidewall and a composite second sidewall;
   manufacturing a composite front wall;
   manufacturing a composite roof having a perimeter rail;
   packaging the composite floor assembly, the composite first sidewall, the composite second sidewall, the composite front wall, the composite roof, and mechanical fasteners in a kit assembly; and
   shipping the kit assembly to a different location for subsequent assembly of the cargo body, wherein the kit assembly is configured for assembly using only the mechanical fasteners, the vertical portion of the L-shaped connector configured to couple to the composite first sidewall, the composite second sidewall, the composite front wall, and a rear door assembly.

2. The method of claim 1, wherein the kit assembly of the packaging step further includes a rear door assembly.

3. The method of claim 1, wherein the kit assembly comprises a plurality of loose pieces, the plurality of loose pieces comprising substantially only mechanical fasteners.

4. The method of claim 1, wherein the top rail extends downward away from a top surface of the composite roof and is configured to receive the composite first sidewall, the composite second sidewall, the composite front wall, and a rear door assembly during assembly after the shipping step.

5. The method of claim 1, wherein the L-shaped connector is adhesively bonded to the composite floor assembly during the manufacturing step.

6. The method of claim 1, wherein:
manufacturing the composite first sidewall comprises adhesively bonding a first base rail connector to an outer surface of the composite first sidewall before the packaging step;
manufacturing the composite second sidewall comprises adhesively bonding a second base rail connector to an outer surface of the composite second sidewall before the packaging step; and
manufacturing the composite front wall comprises adhesively bonding a third base rail connector to an outer surface of the composite front wall before the packaging step;
wherein the L-shaped connector of the floor assembly is configured to be mechanically fastened to the first base rail connector, the second base rail connector, and the third base rail connector during assembly after the shipping step.

7. The method of claim 1, further comprising manufacturing a first vertical rail and a second vertical rail.

8. The method of claim 7, wherein the composite first sidewall, the composite second sidewall, and the composite front wall each includes at least one recess configured to receive a portion of one of the first vertical rail and the second vertical rail.

9. The method of claim 1, wherein at least one of the composite first sidewall, the composite second sidewall, and the composite front wall is smooth and fastener-free during the shipping step.

10. The kit assembly of claim 1, wherein each of the first sidewall and the second sidewall include a plurality of embedded anchors.

* * * * *